US012632374B2

(12) United States Patent
Lu

(10) Patent No.: US 12,632,374 B2
(45) Date of Patent: May 19, 2026

(54) MEMORY CONTROLLERS AND OPERATION METHODS THEREOF AND MEMORY SYSTEMS

(71) Applicant: Yangtze Memory Technologies Co., Ltd., Hubei (CN)

(72) Inventor: Bin Lu, Hubei (CN)

(73) Assignee: Yangtze memory Technologies Co., Ltd., Wuhan (CN)

( * ) Notice: Subject to any disclaimer, the term of this patent is extended or adjusted under 35 U.S.C. 154(b) by 113 days.

(21) Appl. No.: 18/422,968

(22) Filed: Jan. 25, 2024

(65) Prior Publication Data

US 2025/0123959 A1     Apr. 17, 2025

(30) Foreign Application Priority Data

Oct. 16, 2023     (CN) .......................... 202311339215.1

(51) Int. Cl.
G06F 12/00          (2006.01)
G06F 12/02          (2006.01)

(52) U.S. Cl.
CPC .. G06F 12/0246 (2013.01); G06F 2212/7201 (2013.01); G06F 2212/7203 (2013.01); G06F 2212/7205 (2013.01)

(58) Field of Classification Search
None
See application file for complete search history.

(56) References Cited

U.S. PATENT DOCUMENTS

| | | | |
|---|---|---|---|
| 12,353,327 B2 * | 7/2025 | Tsai ..................... | G06F 12/0253 |
| 2024/0296126 A1 * | 9/2024 | Lee ..................... | G06F 12/0246 |
| 2025/0156318 A1 * | 5/2025 | Chen ................... | G06F 12/0246 |

* cited by examiner

*Primary Examiner* — Midys Rojas
(74) *Attorney, Agent, or Firm* — Hanley, Flight & Zimmerman, LLC

(57)          ABSTRACT

The present disclosure discloses memory controllers, operation methods thereof, and memory systems. The memory controller comprises: a first buffer configured to buffer a valid data table and mapping information to be updated, wherein the valid data table is to record a plurality of valid transmission unit counts, the valid transmission unit count indicates the number of transmission units that store valid data in a corresponding block, the mapping information to be updated comprises at least one piece of mapping information from a logical address to a physical address, and each transmission unit corresponds to one physical address; a second buffer configured to buffer a mapping table, wherein the mapping table is to record a plurality of pieces of mapping information; and an acceleration processing circuit configured to: update the mapping table based on the mapping information; and update the valid data table based on the mapping information to be updated.

20 Claims, 7 Drawing Sheets

Buffering, by the first buffer, a valid data table, wherein the valid data table is to record a plurality of valid transmission unit counts, the valid transmission unit count indicates the number of transmission units that store valid data in a corresponding block; buffering, by the second buffer, a mapping table, wherein the mapping table is to record a plurality of pieces of mapping information          S10

Buffering, by the first buffer, mapping information to be updated, wherein the mapping information to be updated comprises at least one piece of mapping information from a logical address to a physical address, and each transmission unit corresponds to one physical address          S20

Updating, by the acceleration processing circuit, the mapping table based on the mapping information to be updated, and updating the valid data table based on the mapping information to be updated          S30

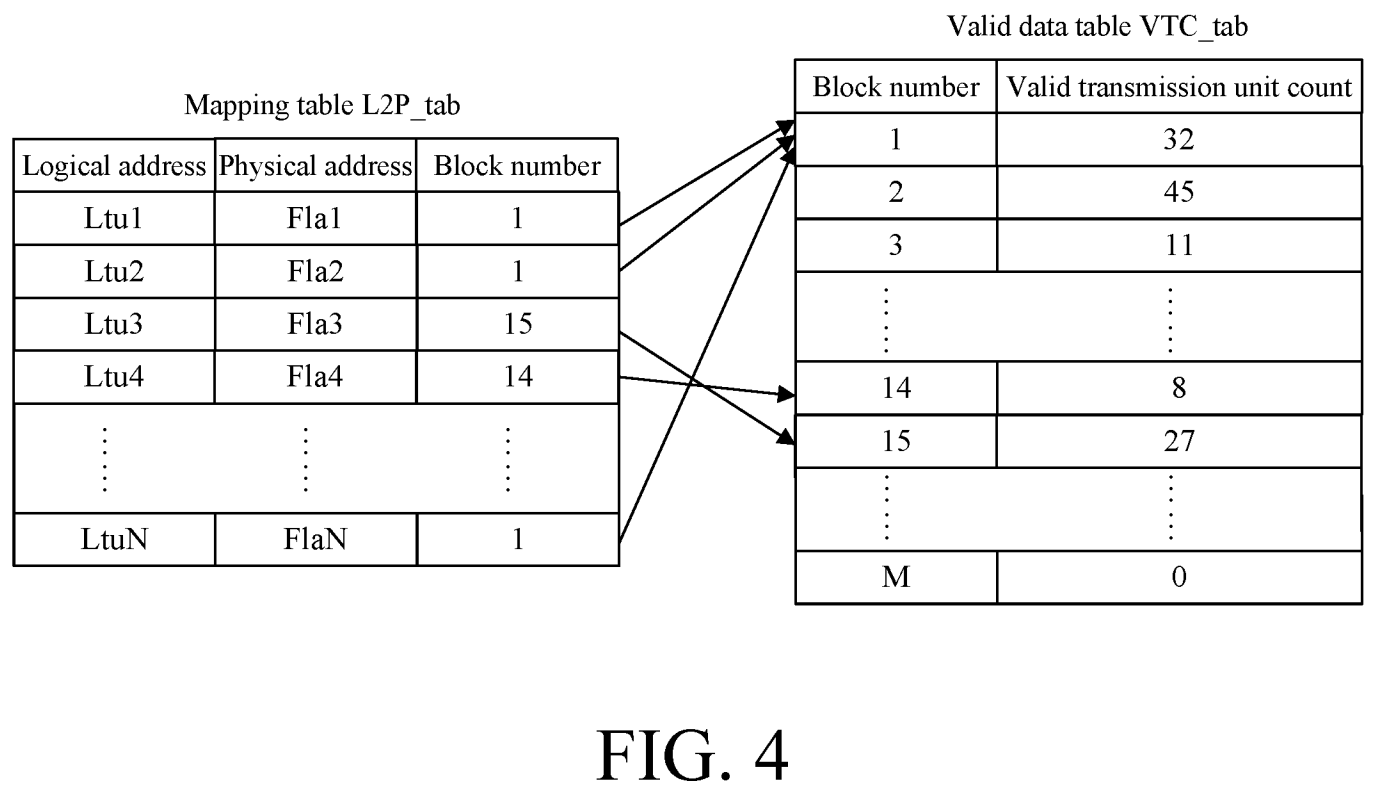

Valid data table VTC_tab

| Block number | Valid transmission unit count |
|---|---|
| 1 | 32 |
| 2 | 45 |
| 3 | 11 |
| ...... | ...... |
| 14 | 8 |
| 15 | 27 |
| ...... | ...... |
| M | 0 |

Mapping table L2P_tab

| Logical address | Physical address | Block number |
|---|---|---|
| Ltu1 | Fla1 | 1 |
| Ltu2 | Fla2 | 1 |
| Ltu3 | Fla3 | 15 |
| Ltu4 | Fla4 | 14 |
| ...... | ...... | ...... |
| LtuN | FlaN | 1 |

FIG. 4

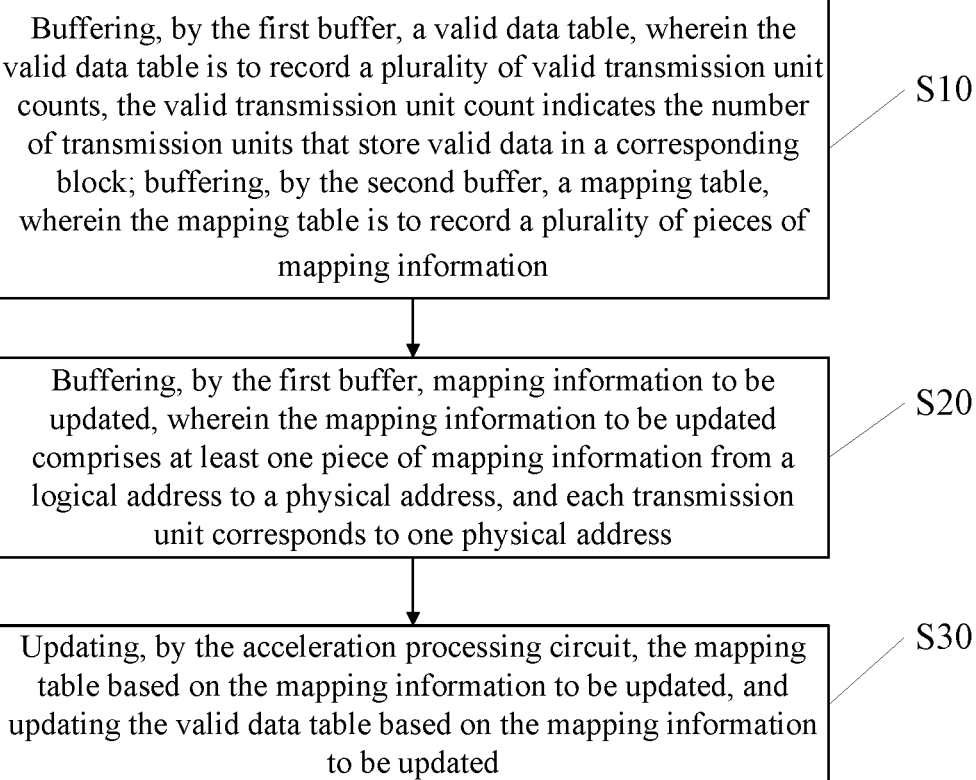

Buffering, by the first buffer, a valid data table, wherein the valid data table is to record a plurality of valid transmission unit counts, the valid transmission unit count indicates the number of transmission units that store valid data in a corresponding block; buffering, by the second buffer, a mapping table, wherein the mapping table is to record a plurality of pieces of mapping information — S10

Buffering, by the first buffer, mapping information to be updated, wherein the mapping information to be updated comprises at least one piece of mapping information from a logical address to a physical address, and each transmission unit corresponds to one physical address — S20

Updating, by the acceleration processing circuit, the mapping table based on the mapping information to be updated, and updating the valid data table based on the mapping information to be updated — S30

FIG. 7

MEMORY CONTROLLERS AND OPERATION METHODS THEREOF AND MEMORY SYSTEMS

CROSS REFERENCE TO RELATED APPLICATION

This application claims priority to and the benefit of Chinese Patent Application 202311339215.1, filed on Oct. 16, 2023, which is hereby incorporated by reference in its entirety.

TECHNICAL FIELD

Examples of the present disclosure relate to the field of semiconductor technology, and inparticular, to a memory controller and an operation method thereof and a memory system.

BACKGROUND

In recent years, the semiconductor integrated circuit industry has undergone rapid development. With the ongoing advancement of semiconductor manufacturing processes, the feature size of semiconductor devices continues to shrink, the integration density of memory keeps increasing, and the performance of the memory becomes more powerful.

A semiconductor memory device may be controlled by a memory controller. A processor in the memory controller may execute software to achieve various operations on the memory device.

BRIEF DESCRIPTION OF THE DRAWINGS

FIG. 4 is a schematic diagram of a mapping table and a valid data table according to an example of the present disclosure;

FIG. 7 is a flow diagram of an operation method of a memory controller according to an example of the present disclosure.

DETAILED DESCRIPTION

Figure 1:
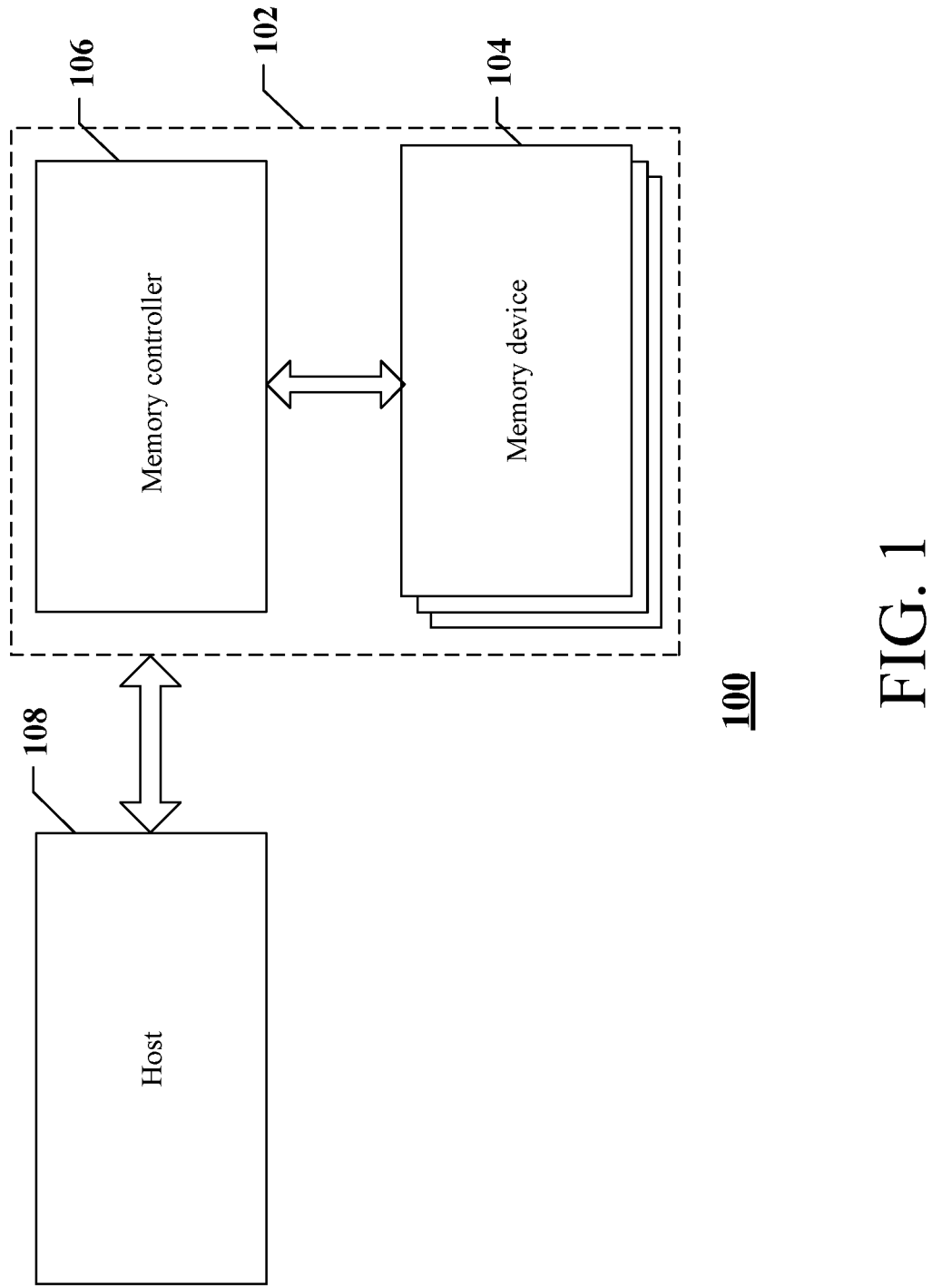
FIG. 1 is a schematic diagram of a system with a memory according to an example of the present disclosure.

To facilitate understanding of the present disclosure, examples of the present disclosure will be described in more detail below with reference to the accompanying drawings. Although examples of the present disclosure are shown in the drawings, it should be understood that the present disclosure may be implemented in various ways and should not be limited to the DETAILED DESCRIPTION set forth herein. Rather, these examples are provided so that the present disclosure can be more thoroughly understood and the scope of the present disclosure can be fully conveyed to those skilled in the art.

In the following description, numerous specific details are given in order to provide a more thorough understanding of the present disclosure. It will be apparent, however, to one skilled in the art that the present disclosure may be practiced without one or more of these details. In some examples, some technical features well-known in the art are not described to avoid confusion with the present disclosure; that is, not all features of the actual example are described here, and well-known functions and structures are not described in detail.

Terms can be understood, at least in part, from usage in the context. For example, depending at least in part on context, the term "one or more" as used herein may be used to describe any feature, structure or characteristic in the singular sense, or may be used to describe a combination of features, structures or characteristics in the plural sense. Similarly, terms such as "a/an" or "said" may equally be understood to convey a singular usage or to convey a plural usage, depending at least in part on the context. Additionally, the term "based on" may be understood as not intended to convey an exclusive set of factors, and may instead allow for the presence of additional factors that are not explicitly described, again depending at least in part on the context.

The terminology used herein is for the purpose of describing particular examples only and is not to be taken as a limitation of the present disclosure unless otherwise stated. As used herein, "a", "an" and "said/the" in singular forms are intended to include the plural forms as well, unless the context clearly dictates otherwise. It should also be understood that at least one of the terms "consists of" or "comprising", when used in this specification, identify the presence of at least one of stated features, integers, operations, elements or components, but do not exclude presence or addition of at least one of one or more other features, integers, operations, elements, components or groups. As used herein, the term "at least one of . . . " includes any and all combinations of the associated listed items.

In order to thoroughly understand the present disclosure, detailed operations and detailed structures will be provided in the following description to explain the technical solutions of the present disclosure. Examples of the present disclosure are described in detail below. However, in addition to these detailed descriptions, the present disclosure may be implemented in other ways.

Due to the advancements of the semiconductor industry, the working efficiency, performance, and stability of the memory controller becomes an urgent issue to be addressed in the industry.

FIG. 1 illustrates a schematic diagram of a system 100 having a memory, according to some aspects of the present disclosure. System 100 can be a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having memory therein.

As shown in FIG. 1, system 100 can include a host 108 and a memory system 102 having one or more memory devices 104 and a memory controller 106. Host 108 can be a processor of an electronic device, such as a central processing unit (CPU), or a system-on-chip (SoC), such as an application processor (AP). Host 108 can be configured to send or receive data to or from the memory device 104.

Memory controller 106 is coupled to the memory device 104 and host 108 and is configured to control the memory device 104, according to some examples. Memory controller 106 can manage the data stored in memory device 104 and communicate with host 108. In some examples, memory controller 106 is designed for operating in a low duty-cycle environment like secure digital memory cards (SD cards), compact Flash (CF) cards, universal serial bus (USB) Flash drives, or other media for use in electronic devices, such as personal computers, digital cameras, mobile phones, etc. In some examples, memory controller 106 is designed for operating in a high duty-cycle environment solid state disks (SSD) or embedded multi-media-cards (eMMCs) used as data storage for mobile devices, such as smartphones, tablets, laptop computers, etc., and enterprise storage arrays.

Memory controller 106 can be configured to control operations of the memory device 104, such as read, erase, and write (aka. program) operations. Memory controller 106 can also be configured to manage various functions with respect to the data stored or to be stored in the memory device 104 including, but not limited to bad-block management, garbage collection, logical-to-physical address conversion, wear leveling, etc. In some examples, memory controller 106 is further configured to process error correction codes (ECC) with respect to the data read from or written to the memory device 104. Any other suitable functions may be performed by memory controller 106 as well, for example, formatting the memory device 104. Memory controller 106 can communicate with a host (e.g., host 108) according to a particular communication protocol. For example, memory controller 106 may communicate with the host 108 through at least one of various interface protocols, such as a USB protocol, an MMC protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a Firewire protocol, etc.

Figure 2A:
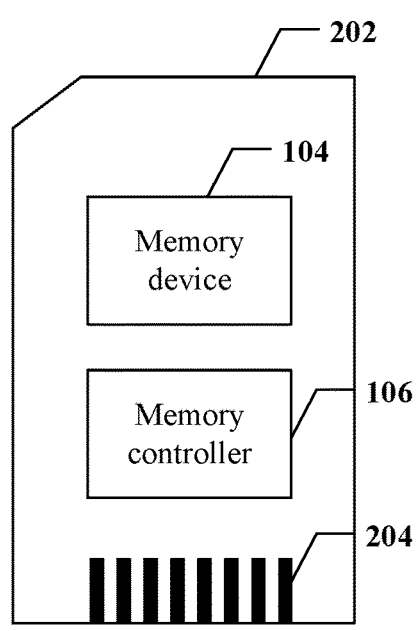
FIG. 2A is a schematic diagram of a memory card according to an example of the present disclosure.
Figure 2B:
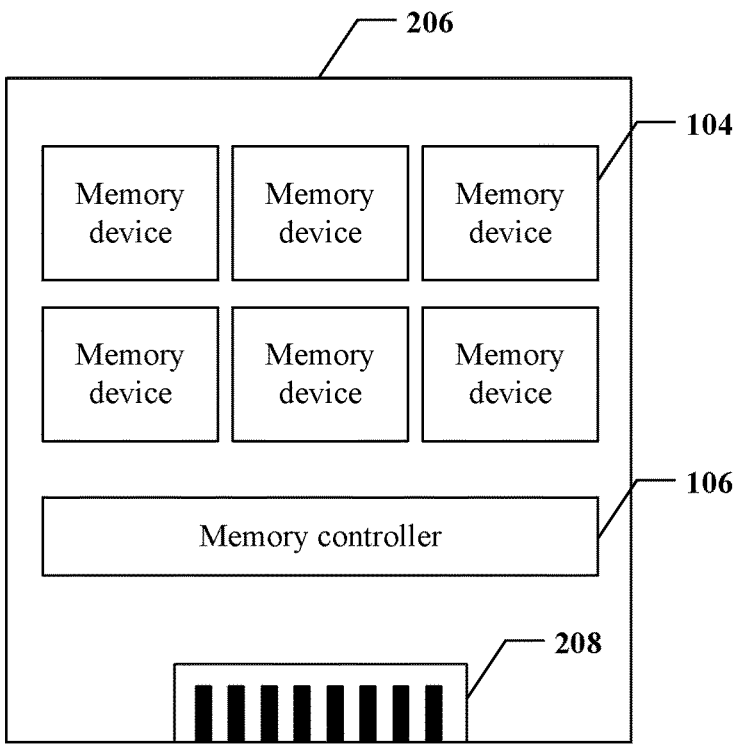
FIG. 2B is a schematic diagram of a solid state drive (SSD) according to an example of the present disclosure.

Memory controller 106 and one or more memory devices 104 can be integrated into various types of storage devices, for example, be included in the same package, such as a universal Flash storage package or an eMMC package. That is, memory system 102 can be implemented and packaged into different types of end electronic products. In one example as shown in FIG. 2A, memory controller 106 and a single memory device 104 may be integrated into a memory card 202. Memory card 202 can include a PC card (PCMCIA, personal computer memory card international association), a CF card, a smart media (SM) card, a memory stick, a multimedia card (MMC), a reduced-size MMC (RS-MMC), a multi-media card micro (MMCmicro), an SD card (SD, miniSD, microSD, SDHC), a universal flash storage (UFS), etc. Memory card 202 can further include a memory card connector 204 coupling the memory card 202 with a host (e.g., host 108 in FIG. 1). In another example as shown in FIG. 2B, the memory controller 106 and multiple memory devices 104 may be integrated into an SSD 206. SSD 206 can further include an SSD connector 208 coupling SSD 206 with a host (e.g., host 108 in FIG. 1). In some examples, at least one of the storage capacity or the operation speed of SSD 206 is greater than those of memory card 202.

In the examples of the present disclosure, each of the dies may include one or more memory cell arrays. One type of memory cell, such as a single-level cell (SLC), can store one bit per cell. Other types of memory cells, such as Multi-Level Cell (MLC), Trinary-Level Cell (TLC), Quad-Level Cell (QLC) and Penta-Level Cell (PLC) can store multiple bits per cell. In some examples, each of the memory devices may include one or more memory cell arrays, such as an SLC array, an MLC array, a TLC array, a QLC array, or any combination of such memory cell arrays.

Figure 3:
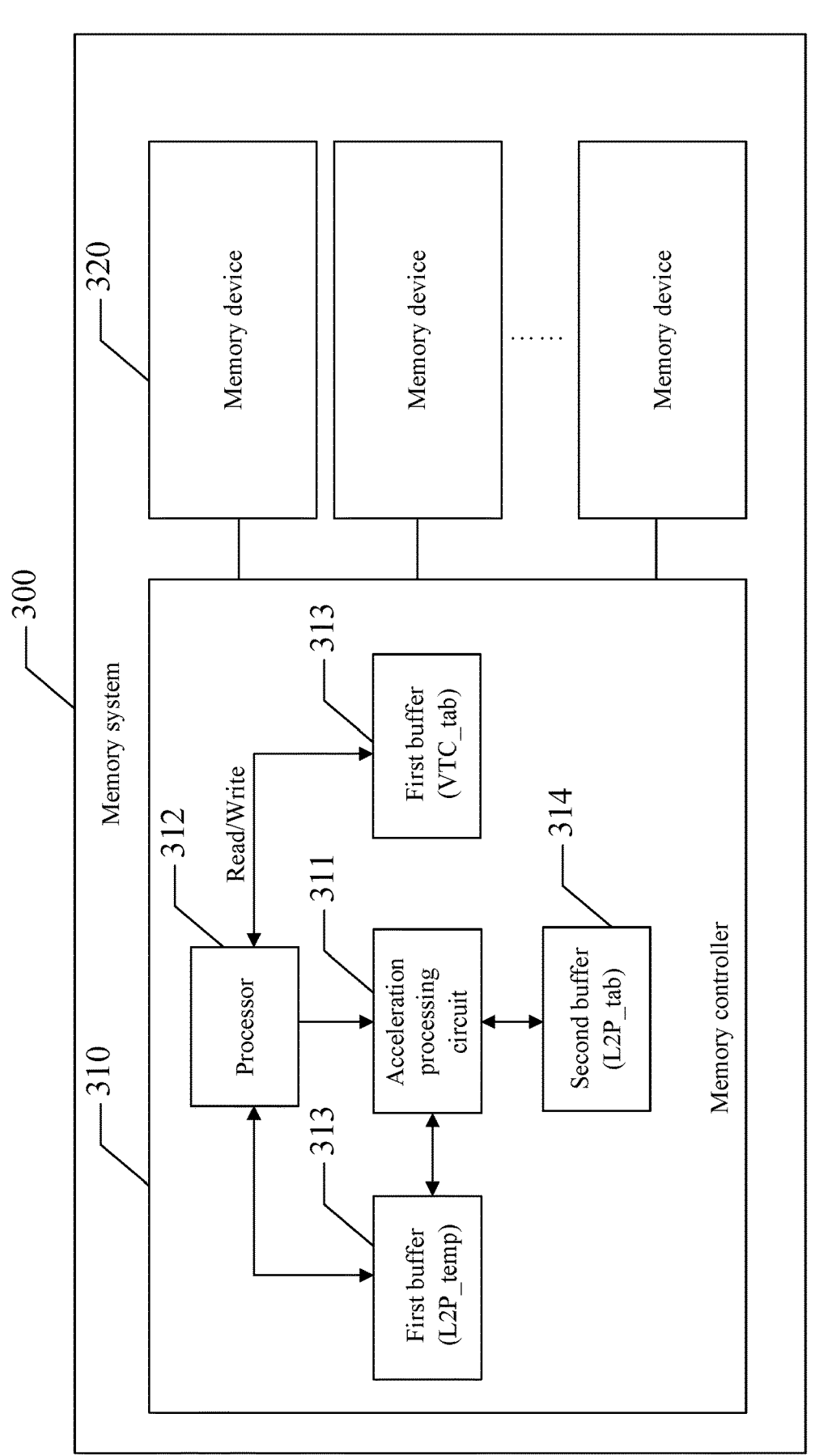
FIG. 3 is a schematic diagram of a memory system according to an example of the present disclosure.

FIG. 3 shows a memory system 300 according to an example of the present disclosure. The memory system 300 comprises a memory controller 310 and one or more memory devices 320 coupled with the memory controller 310. The memory controller 310 comprises at least an acceleration processing circuit 311, a processor 312, a first buffer 313, and a second buffer 314. The memory device 320 comprises a plurality of blocks.

The processor 312 may control overall operations of the memory controller 310, to perform operations such as read, write, and erase etc. on the memory device 320. In an example, the processor 312 may be configured to run various firmware or software in the memory controller 310. The processor 312 may comprise a central processing unit (CPU), a microprocessor, a digital signal processor (DSP), an application-specific integrated circuit (ASIC), a field-programmable gate array (FPGA) or other programmable logic devices, discrete gates or transistor logic devices, discrete hardware components, etc. The processor 312 may further comprise a general-purpose processor or any other processors.

In the memory controller 310, mapping information from a logical address to a physical address may be maintained by using a flash translation layer (FTL). The logical address forms a storage space of the memory device 320 perceived by upper-layer software such as an operating system, etc. The physical address is an address for accessing a physical memory cell of the memory device 320. In some examples, the address mapping can also be implemented by using an intermediate address form, for example, a logical address is mapped to an intermediate address, and the intermediate address is further mapped to a physical address. The intermediate address herein may comprise one or more levels of intermediate address. The flash translation layer may further be configured to perform maintenance operations such as wear leveling, garbage collection (GC), etc.

In some examples, the flash translation layer may be implemented as at least one of software or firmware. The processor 312 may drive the flash translation layer to perform various maintenance operations described above. In some other examples, the flash translation layer may be implemented by various hardware automation circuits configured to perform the maintenance operations described above. That is, the flash translation layer may be implemented as hardware, and the maintenance operations described above may be performed by the hardware.

The second buffer 314 may be configured to buffer a mapping table L2P_tab. The second buffer 314 comprises, but not limited to, a double data rate (DDR) synchronous dynamic random access memory. As shown in FIG. 4, the mapping table L2P_tab may comprise a plurality of entries, wherein each entry records mapping information from one logical address (Ltu) to a physical address (Fla) and a block number corresponding to the physical address. It is to be noted that the mapping table L2P_tab buffered in the second buffer 314 herein is a part of an L2P mapping table of the entire memory device 320, and the other part of the L2P mapping table is stored in the memory device 320.

The first buffer 313 may be configured to buffer a valid data table VTC_tab and mapping information to be updated L2P_temp. The first buffer 313 comprises, but not limited to, a tightly coupled memory (TCM), etc., and the first buffer 313 can implement high-speed interaction with the processor 312. The mapping information to be updated L2P_temp herein may be generated by the processor 312 based on a logical address received from an external host, and buffered by the processor 312 into the first buffer 313. In some examples, the mapping information to be updated L2P_temp may further be generated inside the memory controller 310 in operations such as garbage collection, etc.

As shown in FIG. 4, the valid data table VTC_tab may comprise a plurality of entries, wherein each entry records a block number and a valid transmission unit count (VTC) corresponding to the block number. Each valid transmission unit count indicates the number of transmission units that store valid data in a corresponding block. It is to be noted that, a block may comprise a plurality of transmission units, and each transmission unit corresponds to a physical address. A capacity size of a transmission unit and its physical position in the memory device 320 are not excessively limited herein. In an example, the transmission unit may be a physical unit smaller than a page (or the transmission unit may also be a page). A transmission unit that records valid data is referred to as a valid transmission unit, and a transmission unit that records invalid data is referred to as an invalid transmission unit. The invalid data in the invalid transmission unit may be cleared when the memory controller 310 performs a garbage collection operation. In some examples, the memory controller 310 may further set one or more specific transmission units in the block as invalid transmission units according to actual working requirements.

The valid transmission unit count may reflect the number of valid transmission units in the block. Therefore, according to the valid data table VTC_tab, occupied storage space of the memory device 320 can be obtained, a size of the remaining storage space can be further deduced, and the valid data table VTC_tab may further be used to indicate blocks on which garbage collection needs to be performed.

It is to be noted that various content and values in the valid data table VTC_tab and the mapping table L2P_tab shown in FIG. 4 are only used as an example for ease of understanding, and do not constitute any limitation to the present application.

The acceleration processing circuit 311 may be configured to update the mapping table L2P_tab in the second buffer 314 based on the mapping information to be updated L2P_temp. The acceleration processing circuit 311 herein comprises, but not limited to, a direct memory access (DMA) circuit and a table access assist (TAA) circuit. The acceleration processing circuit 311 can improve the speed of updating the mapping information to be updated L2P_temp to the mapping table L2P_tab in the second buffer 314 by the processor 312, thereby improving the performance of the memory system 300.

It may be understood that during operations such as write, erase, garbage collection, etc. performed on the memory device 320, data stored in transmission units in blocks is changed. As a result, mapping information from the logical address to the physical address corresponding to each transmission units is changed, and the valid transmission unit count corresponding to each block is also changed. Therefore, the valid data table VTC_tab in the first buffer 313 and the mapping table L2P_tab in the second buffer 314 need to be updated in real time. That is, the update of the mapping table L2P_tab and the update of the valid data table VTC_tab are associated with each other.

In this way, the processor 312 can access the first buffer 313 at a faster speed, to buffer the mapping information to be updated L2P_temp into the first buffer 313. Next, the processor 312 may send an update command to the acceleration processing circuit 311, and the acceleration processing circuit 311 acquires the mapping information to be updated L2P_temp from the first buffer 313 in response to the update command. Finally, the acceleration processing circuit 311 updates the mapping table L2P_tab in the second buffer 314 based on the mapping information to be updated L2P_temp. It may be understood that the processor 312 updates the mapping table L2P_tab by the first buffer 313 and the acceleration processing circuit 311, so that the working efficiency of the memory controller 310 can be improved.

The processor 312 may further execute corresponding software to actively update the valid data table VTC_tab in the first buffer 313 when (or after) buffering the mapping information to be updated L2P_temp into the first buffer 313. However, the processor 312 needs to occupy more hardware resources in the process of updating continuous large-scale mapping information to be updated L2P_temp to the mapping table L2P_tab. In this case, a relatively complex software design is required to balance between hardware resources of the processor 312 for updating the mapping table L2P_tab and for updating the valid data table VTC_tab. In addition, the processor 312 fully participates in the update of the mapping table L2P_tab and the valid data table VTC_tab, resulting in low working efficiency of the memory controller 310. Furthermore, because the processor 312 executes software to update the valid data table VTC_tab, the update of the valid data table is prone to an error due to a software error, which affects the stability of the memory controller 310.

Figure 5:
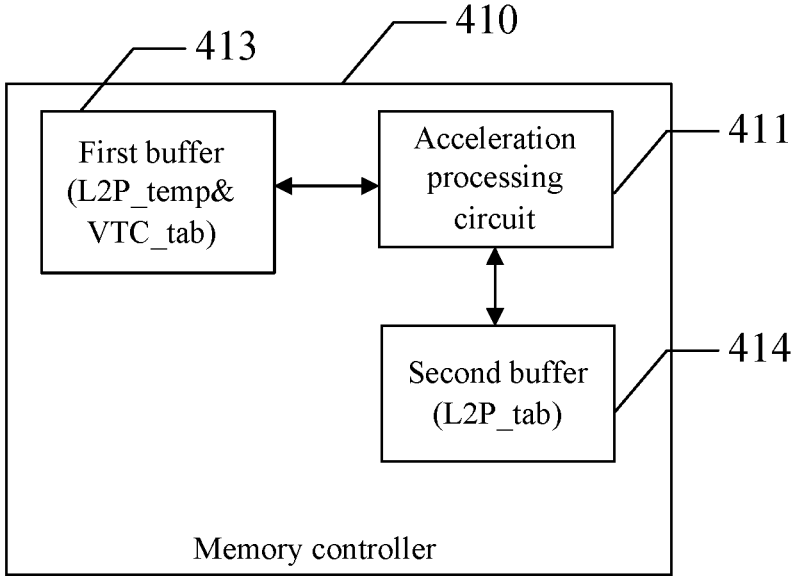
FIG. 5 is a schematic diagram of a memory controller according to an example of the present disclosure.

As shown in FIG. 5, the present disclosure provides a memory controller 410. The memory controller 410 comprises: a first buffer 413 configured to buffer a valid data table VTC_tab and mapping information to be updated L2P_temp, wherein the valid data table VTC_tab is to record a plurality of valid transmission unit counts, the valid transmission unit count indicates the number of transmission units that store valid data in a corresponding block, the mapping information to be updated L2P_temp comprises at least one piece of mapping information from a logical address to a physical address, and each transmission unit corresponds to one physical address; a second buffer 414 configured to buffer a mapping table L2P_tab, wherein the mapping table L2P_tab is to record a plurality of pieces of mapping information; and an acceleration processing circuit 411 coupled to the first buffer 431 and the second buffer 414 respectively and configured to: update the mapping table L2P_tab based on the mapping information to be updated L2P_temp, and update the valid data table VTC_tab based on the mapping information to be updated L2P_temp.

In the examples of the present disclosure, the first buffer 413 may be configured to buffer the valid data table VTC_tab and the mapping information to be updated L2P_temp. The first buffer 413 comprises, but not limited to, a tightly coupled memory, etc. The second buffer 414 may be configured to buffer the mapping table L2P_tab. The second buffer 414 comprises, but not limited to, a double data rate synchronous dynamic random access memory.

Refer to FIG. 4, the mapping table L2P_tab may comprise a plurality of entries, wherein each entry records mapping information from a logical address to a physical address and a block number corresponding to the physical address. The valid data table VTC_tab may comprise a plurality of entries, wherein each entry records a block number and a valid transmission unit count corresponding to the block number. Each valid transmission unit count indicates the number of transmission units that store valid data in a corresponding block. It is to be noted that, a block may comprise a plurality of transmission units, and each transmission unit corresponds to a physical address. A capacity size of a transmission unit and its physical position in the memory device are not excessively limited herein. In an example, the transmission unit may be a physical unit smaller than a page (or the transmission unit may also be a page). A transmission unit that records valid data is referred to as a valid transmission unit, and a transmission unit that records invalid data is referred to as an invalid transmission unit. The invalid data in the invalid transmission unit may be cleared when the memory controller 410 performs a garbage collection operation. In some examples, the memory controller 410 may further set one or more specific transmission units in the block as invalid transmission units according to actual working requirements.

The valid transmission unit count may reflect the number of valid transmission units in the block. Therefore, according to the valid data table VTC_tab, occupied storage space of the memory device can be obtained, a size of the remaining storage space can be further deduced, and the valid data table VTC_tab may further be used to indicate blocks on which garbage collection needs to be performed.

The acceleration processing circuit 411 is coupled to the first buffer 413 and the second buffer 414 respectively. The acceleration processing circuit 411 may be configured to update the mapping table L2P_tab in the second buffer 414 based on the mapping information to be updated L2P_temp, and update the valid data table VTC_tab in the first buffer 413 based on the mapping information to be updated L2P_temp. The acceleration processing circuit 411 herein comprises, but not limited to, a table access assist circuit. The table access assist circuit has a function of quickly accessing and quickly updating various tables in the buffer and memory. That is, the acceleration processing circuit 411 may autonomously update the valid data table VTC_tab according to the mapping information to be updated L2P_temp. Therefore, the memory controller 410 does not need to update the valid data table VTC_tab in the first buffer 413 through a processor, and also does not require execution of any software or firmware program. In an example, the acceleration processing circuit 411 may have an arbiter circuit, a comparator circuit, a register, etc., to automatically increase or automatically reduce the valid transmission unit counts corresponding to each block in the valid data table VTC_tab according to one or more pieces of L2P mapping information in the mapping information to be updated L2P_temp.

In this way, in an aspect, the update of the valid data table VTC_tab through the acceleration processing circuit 411 can reduce resource occupation of the processor, thereby improving the working efficiency and performance of the memory controller 410. In another aspect, the processor does not need to execute software to update the valid data table VTC_tab, thereby reducing the impact of the software error on the stability of the memory controller 410, and at the same time simplifying the software design.

Figure 6:
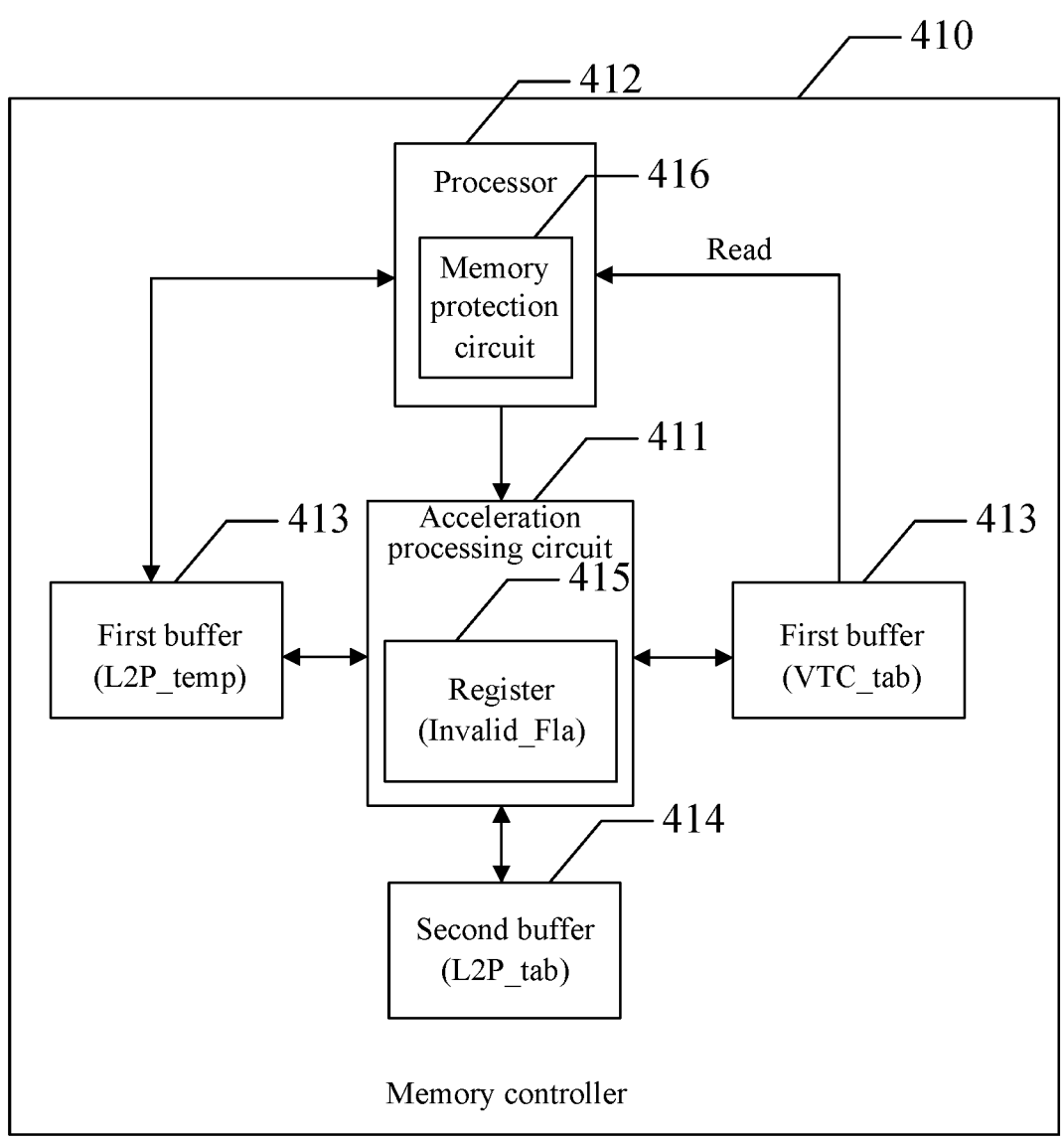
FIG. 6 is a schematic diagram of another memory controller according to an example of the present disclosure.

In some examples, as shown in FIG. 6, the acceleration processing circuit 411 comprises a register 415. The register 415 is configured to store an invalid physical address Invalid_Fla. In some examples, the acceleration processing circuit 411 is configured to update the valid data table VTC_tab based on the mapping information to be updated L2P_temp and the invalid physical address Invalid_Fla.

In some examples, the acceleration processing circuit 411 comprises a table access assist circuit, and the register 415 comprises a zero register.

In the examples of the present disclosure, the acceleration processing circuit 411 may comprise a register 415, and the register 415 may store the invalid physical address Invalid_Fla. The invalid physical address Invalid_Fla herein may be determined by at least one of the flash translation layer or the processor. In an example, the invalid physical address Invalid_Fla may correspond to a specific transmission unit in a block, for example, a transmission unit that is not used to store data, or a transmission unit whose function is abnormal.

In this way, the acceleration processing circuit 411 may match one or more physical addresses in the mapping information to be updated L2P_temp against the invalid physical address Invalid_Fla in the register 415, to achieve automatic increase and automatic reduction of the valid transmission unit counts of the corresponding block in the valid data table VTC_tab. It should be noted that, the register 415 may comprise one register or a combination of a plurality of registers. The register 415 may store one or more invalid physical addresses Invalid_Fla. In a case that the register 415 stores a plurality of invalid physical addresses Invalid_Fla, the acceleration processing circuit 411 may match the physical address in the mapping information to be updated L2P_temp against all the invalid physical addresses Invalid_Fla in the register 415 one by one, and automatically increase and automatically reduce the valid transmission unit counts of the corresponding block.

In some examples, the acceleration processing circuit 411 is configured to: in response to the physical address in the mapping information to be updated L2P_temp being the same as the invalid physical address Invalid_Fla, reduce the valid transmission unit count of the corresponding block; or in response to the physical address in the mapping information to be updated L2P_temp being different from the invalid physical address Invalid_Fla, increase the valid transmission unit count of the corresponding block.

In the examples of the present disclosure, the acceleration processing circuit 411 may match the physical address in the mapping information to be updated L2P_temp against the invalid physical address Invalid_Fla in the register 415 through the arbiter circuit, the comparator circuit, etc. In a case that one physical address in the mapping information to be updated L2P_temp is the same as the invalid physical address Invalid_Fla, it indicates that data written to a transmission unit corresponding to the physical address is invalid data, that is, the transmission unit is an invalid transmission unit. The acceleration processing circuit 411 may determine the block number corresponding to the physical address, thereby reducing the valid transmission unit count corresponding to the block in the valid data table VTC_tab. In a case that one physical address in the mapping information to be updated L2P_temp is different from the invalid physical address Invalid_Fla, it indicates that data written to a transmission unit corresponding to the physical address is valid data, that is, the transmission unit is a valid transmission unit. The acceleration processing circuit 411 may determine the block number corresponding to the physical address, thereby increasing the valid transmission unit count corresponding to the block in the valid data table VTC_tab.

In some examples, the acceleration processing circuit 411 is further configured to: determine an upper limit value and a lower limit value of the valid transmission unit count; in response to the valid transmission unit count being equal to the upper limit value, stop increasing the valid transmission unit count; and/or in response to the valid transmission unit count being equal to the lower limit value, stop reducing the valid transmission unit count.

In the examples of the present disclosure, the acceleration processing circuit 411 may further determine an upper limit value and a lower limit value of the valid transmission unit count corresponding to each block in the memory device, to avoid an error caused by overflow in a process in which the valid transmission unit count recorded in the valid data table VTC_tab automatically increases and automatically reduces.

It may be understood that, if a processor 412 updates the valid data table VTC_tab through software, the processor 412 does not limit the update of the valid data table VTC_tab, and the valid transmission unit count is prone to an error due to a software error, such as the valid transmission unit count being less than zero etc., which in turn affects the stability of the memory controller 410.

In some examples, the acceleration processing circuit 411 may stop increasing the valid transmission unit count in response to the valid transmission unit count being equal to the upper limit value, that is, the valid transmission unit count will not be greater than the upper limit value. The acceleration processing circuit 411 may further stop reducing the valid transmission unit count in response to the valid transmission unit count being equal to the lower limit value, that is, the valid transmission unit count will not be less than the lower limit value. In this way, the automatic increase and reduction operations performed on the valid transmission unit count by the acceleration processing circuit 411 will not generate an overflow error, thus achieving overflow protection on a hardware level, and improving the stability of the memory controller 410.

In some examples, in a case that the valid transmission unit count is equal to the upper limit value and one physical address in the mapping information to be updated L2P_temp is different from the invalid physical address Invalid_Fla, the acceleration processing circuit 411 will not continue to increase the valid transmission unit count, but instead send a first error prompt signal to the processor 412. The first error prompt signal herein represents that the valid transmission unit count may overflow the upper limit value. In a case that the valid transmission unit count is equal to the lower limit value and one physical address in the mapping information to be updated L2P_temp is the same as the invalid physical address Invalid_Fla, the acceleration processing circuit 411 will not continue to reduce the valid transmission unit count, but instead send a second error prompt signal to the processor 412. The second error prompt signal herein represents that the valid transmission unit count may overflow the lower limit value. In this way, the processor 412 may perform diagnosis on the memory controller 410 and the memory device according to at least one of the first error prompt signal or the second error prompt signal to eliminate a potential error, thereby improving the error self-diagnosis capability of the memory system.

In some examples, the acceleration processing circuit 411 is further configured to determine the upper limit value according to the number of the transmission units in the block.

In the examples of the present disclosure, the acceleration processing circuit 411 may set the total number of transmission units in the block as the upper limit value. That is, in a case that all transmission units in the block are valid transmission units, the valid transmission unit count corresponding to the block reaches the upper limit value.

In some examples, as shown in FIG. 6, the memory controller 410 further comprises: a processor 412 coupled to the first buffer 413 and configured to: generate the mapping information to be updated L2P_temp based on a received logical address, and buffer the mapping information to be updated L2P_temp into the first buffer 413.

In the examples of the present disclosure, the memory controller 410 further comprise a processor 412 coupled to the first buffer 413. The processor 412 may generate the mapping information to be updated L2P_temp based on a logical address received from an external host. It may be understood that the receiving the logical address from the external host herein represents that the host needs to store data in the memory device. Therefore, the processor 412 need to generate mapping information from a logical address to a physical address corresponding to new data, that is, the mapping information to be updated L2P_temp. In an example, the processor 412 may generate the mapping information to be updated L2P_temp through the flash translation layer and based on the received logical address.

In addition, the processor 412 may control overall operations of the memory controller 410, to perform operations such as read, write, and erase etc. on the memory device. In an example, the processor 412 may be configured to run various firmware or software in the memory controller 410. The processor 412 may comprise a central processing unit, a microprocessor, a digital signal processor, an application-specific integrated circuit, a field-programmable gate array or other programmable logic devices, discrete gates or transistor logic devices, discrete hardware components, etc. The processor 412 may further comprise a general-purpose processor or any other processors.

In some examples, the processor 412 is further configured to send an update command to the acceleration processing circuit 411, and the acceleration processing circuit 411 is configured to: in response to the update command acquire the mapping information to be updated L2P_temp from the first buffer 413; and update the valid data table VTC_tab automatically based on the mapping information to be updated L2P_temp.

In the examples of the present disclosure, the processor 412 can access the first buffer 413 at a faster speed, to buffer the mapping information to be updated L2P_temp into the first buffer 413. Next, the processor 412 may send an update command to the acceleration processing circuit 411, and the acceleration processing circuit 411 acquires the mapping information to be updated L2P_temp from the first buffer 413 in response to the update command. The acceleration processing circuit 411 may update the valid data table VTC_tab in the first buffer 413 automatically based on the mapping information to be updated L2P_temp, wherein the process of automatically updating the valid data table VTC_tab could be referred to the above example of the acceleration processing circuit 411 matching the invalid physical address Invalid_Fla to realize automatic increasing and reducing, which will not be repeated here. In this way, the update of the valid data table VTC_tab through the acceleration processing circuit 411 can reduce resource occupation of the processor, thereby improving the working efficiency and performance of the memory controller 410.

In some examples, the processor 412 comprises a memory protection circuit 416 configured to: inhibit the processor 412 from updating the valid data table VTC_tab.

In the examples of the present disclosure, the processor 412 may further have a memory protection circuit 416. The memory protection circuit 416 herein comprises, but not limited to, logical circuits such as a memory protection unit (MPU), etc. In this way, the memory protection circuit 416 may inhibit the processor 412 from performing a write operation on a specific segment in the first buffer 413, that is, inhibit the processor 412 from updating the valid data table VTC_tab, to prevent the processor 412 from performing a misoperation on the valid data table VTC_tab, thereby improving the stability of the memory controller 410. It may be understood that, the processor 412 can only perform read operations on the valid data table VTC_tab in the first buffer 413, but cannot perform write operations on the valid data table VTC_tab.

In some examples, since that the access speed for the first buffer 413 by the acceleration processing circuit 411 is much faster than that for the second buffer 414, so that the valid data table VTC_tab can be quickly updated while waiting for the second cache 414 to be accessed to increase the working efficiency of the memory controller 410.

In some examples, the processor 412 is further configured to: acquire the valid data table VTC_tab from the first buffer 413 in response to a trim command from a host; and determine a block on which garbage collection needs to be performed in the memory device based on the valid data table VTC_tab.

In the examples of the present disclosure, the processor 412 may acquire the valid data table VTC_tab from the first buffer 413 in response to a trim command of the host, and determine a block on which garbage collection needs to be performed according to a plurality of valid transmission unit counts in the valid data table VTC_tab.

The valid transmission unit count may reflect the number of valid transmission units in the block. Therefore, according to the valid data table VTC_tab, occupied storage space of the memory device can be obtained, a size of the remaining storage space can be further deduced, and the valid data table VTC_tab may further be used to indicate blocks on which garbage collection needs to be performed. In an example, the larger one valid transmission unit count in the valid data table VTC_tab is, the more transmission units in the corresponding block that store valid data. The smaller one valid transmission unit count in the valid data table VTC_tab is, the fewer transmission units in the corresponding block that store valid data, that is, the more transmission units that store invalid data. Therefore, a garbage collection operation may be performed on a block with a smaller valid transmission unit count. A method for setting a threshold may be used herein to determine a block on which garbage collection needs to be performed. For example, in a case that the valid transmission unit count is less than the threshold, the garbage collection is performed on the corresponding block.

As shown in FIG. 7, the present disclosure provides an operation method of a memory controller. The memory controller comprises a first buffer, a second buffer, and an acceleration processing circuit coupled to the first buffer and the second buffer respectively, and the operation method comprises the following operations.

Operation S10: Buffering, by the first buffer, a valid data table, wherein the valid data table is to record a plurality of valid transmission unit counts, the valid transmission unit count indicates the number of transmission units that store valid data in a corresponding block; buffering, by the second buffer, a mapping table, wherein the mapping table is to record a plurality of pieces of mapping information.

Operation S20: Buffering, by the first buffer, mapping information to be updated, wherein the mapping information to be updated comprises at least one piece of mapping information from a logical address to a physical address, and each transmission unit corresponds to one physical address.

Operation S30: Updating, by the acceleration processing circuit, the mapping table based on the mapping information to be updated, and updating the valid data table based on the mapping information to be updated.

It should be understood that the operations as shown in FIG. 7 are not exclusive, and other operations can also be performed before, after, or between any of the illustrated operations.

In some examples, the acceleration processing circuit comprises a register configured to store an invalid physical address, and the updating, by the acceleration processing circuit, the valid data table based on the mapping information to be updated comprises: updating, by the acceleration processing circuit, the valid data table based on the mapping information to be updated and the invalid physical address.

In some examples, the updating, by the acceleration processing circuit, the valid data table based on the mapping information to be updated and the invalid physical address comprises: in response to the physical address in the mapping information to be updated being the same as the invalid physical address, reducing, by the acceleration processing circuit, the valid transmission unit count of the corresponding block; or in response to the physical address in the mapping information to be updated being different from the invalid physical address, increasing, by the acceleration processing circuit, the valid transmission unit count of the corresponding block.

In some examples, the operation method further comprises: determining, by the acceleration processing circuit, an upper limit value and a lower limit value of the valid transmission unit count; in response to the valid transmission unit count being equal to the upper limit value, stopping, by the acceleration processing circuit, increasing the valid transmission unit count; and/or in response to the valid transmission unit count being equal to the lower limit value, stopping, by the acceleration processing circuit, reducing the valid transmission unit count.

In some examples, the determining, by the acceleration processing circuit, an upper limit value of the valid transmission unit count comprises: determining, by the acceleration processing circuit, the upper limit value according to the number of the transmission units in the block.

In some examples, the memory controller further comprises a processor coupled to the first buffer, and the operation method further comprises: generating, by the processor, the mapping information to be updated based on a received logical address, and buffering the mapping information to be updated into the first buffer.

In some examples, the operation method further comprises: sending, by the processor, an update command to the acceleration processing circuit; and acquiring, by the acceleration processing circuit, the mapping information to be updated from the first buffer in response to the update command, and wherein the updating, by the acceleration processing circuit, the valid data table based on the mapping information to be updated comprises: updating, by the acceleration processing circuit, the valid data table automatically based on the mapping information to be updated.

In some examples, the processor comprises a memory protection circuit, and the operation method further comprises: inhibiting, by the memory protection circuit, the processor from updating the valid data table.

In some examples, the operation method further comprises: acquiring, by the processor, the valid data table from the first buffer in response to a trim command from a host; and determining, by the processor, a block on which garbage collection needs to be performed in a memory device based on the valid data table.

The present disclosure provides a memory system, comprising: a memory device comprising a plurality of blocks; the memory controller in any one of the above examples, wherein the memory controller is configured to control the memory device and update a valid data table, wherein the valid data table is to record a plurality of valid transmission unit counts, the valid transmission unit count indicates the number of transmission units that store valid data in a corresponding block.

The present disclosure provides a memory controller and an operation method thereof and a memory system.

In a first aspect, the present disclosure provides a memory controller. The memory controller comprises:

a first buffer configured to buffer a valid data table and mapping information to be updated, wherein the valid data table is to record a plurality of valid transmission unit counts, the valid transmission unit count indicates the number of transmission units that store valid data in a corresponding block, the mapping information to be updated comprises at least one piece of mapping information from a logical address to a physical address, and each transmission unit corresponds to one physical address;

a second buffer configured to buffer a mapping table, wherein the mapping table is to record a plurality of pieces of mapping information; and an acceleration processing circuit coupled to the first buffer and the second buffer respectively and configured to:

update the mapping table based on the mapping information to be updated; and update the valid data table based on the mapping information to be updated.

In some examples, the acceleration processing circuit comprises a register configured to store an invalid physical address, and the acceleration processing circuit is configured to:

update the valid data table based on the mapping information to be updated and the invalid physical address.

In some examples, the acceleration processing circuit is configured to:

in response to the physical address in the mapping information to be updated being the same as the invalid physical address, reduce the valid transmission unit count of the corresponding block;

or in response to the physical address in the mapping information to be updated being different from the invalid physical address, increase the valid transmission unit count of the corresponding block.

In some examples, the acceleration processing circuit is further configured to:

determine an upper limit value and a lower limit value of the valid transmission unit count;

in response to the valid transmission unit count being equal to the upper limit value, stop increasing the valid transmission unit count;

and/or in response to the valid transmission unit count being equal to the lower limit value, stop reducing the valid transmission unit count.

In some examples, the acceleration processing circuit is further configured to:

determine the upper limit value according to the number of the transmission units in the block.

In some examples, the acceleration processing circuit comprises a table access assist circuit, and the register comprises a zero register.

In some examples, the memory controller further comprises:

a processor coupled to the first buffer and configured to:

generate the mapping information to be updated based on a received logical address, and buffer the mapping information to be updated into the first buffer.

In some examples, the processor is further configured to send an update command to the acceleration processing circuit, and wherein the acceleration processing circuit is configured to:

in response to the update command, acquire the mapping information to be updated from the first buffer; and update the valid data table automatically based on the mapping information to be updated.

In some examples, the processor comprises a memory protection circuit configured to:

inhibit the processor from updating the valid data table.

In some examples, the processor is further configured to:

in response to a trim command from a host, acquire the valid data table from the first buffer; and determine a block on which garbage collection needs to be performed in a memory device based on the valid data table.

In a second aspect, the present disclosure provides an operation method of a memory controller. The memory controller comprises a first buffer, a second buffer, and an acceleration processing circuit coupled to the first buffer and the second buffer respectively, wherein the operation method comprises:

buffering, by the first buffer, a valid data table and mapping information to be updated, wherein the valid data table is to record a plurality of valid transmission unit counts, the valid transmission unit count indicates the number of transmission units that store valid data in a corresponding block, the mapping information to be updated comprises at least one piece of mapping information from a logical address to a physical address, and each transmission unit corresponds to one physical address;

buffering, by the second buffer, a mapping table, wherein the mapping table is to record a plurality of pieces of mapping information; and updating, by the acceleration processing circuit, the mapping table based on the mapping information to be updated, and updating the valid data table based on the mapping information to be updated.

In some examples, the acceleration processing circuit comprises a register configured to store an invalid physical address, and the updating, by the acceleration processing circuit, the valid data table based on the mapping information to be updated comprises:

updating, by the acceleration processing circuit, the valid data table based on the mapping information to be updated and the invalid physical address.

In some examples, the updating, by the acceleration processing circuit, the valid data table based on the mapping information to be updated and the invalid physical address comprises:

in response to the physical address in the mapping information to be updated being the same as the invalid physical address, reducing, by the acceleration process-
ing circuit, the valid transmission unit count of the
corresponding block;
or
in response to the physical address in the mapping infor-
mation to be updated being different from the invalid
physical address, increasing, by the acceleration pro-
cessing circuit, the valid transmission unit count of the
corresponding block.
In some examples, the operation method further com-
prises:
    determining, by the acceleration processing circuit, an
    upper limit value and a lower limit value of the valid
    transmission unit count;
    in response to the valid transmission unit count being
    equal to the upper limit value, stopping, by the accel-
    eration processing circuit, increasing the valid trans-
    mission unit count;
    and/or
    in response to the valid transmission unit count being
    equal to the lower limit value, stopping, by the accel-
    eration processing circuit, reducing the valid transmis-
    sion unit count.
In some examples, the determining, by the acceleration
processing circuit, an upper limit value of the valid trans-
mission unit count comprises:
    determining, by the acceleration processing circuit, the
    upper limit value according to the number of the
    transmission units in the block.
In some examples, the memory controller further com-
prises a processor coupled to the first buffer, and the opera-
tion method further comprises:
    generating, by the processor, the mapping information to
    be updated based on a received logical address, and
    buffering the mapping information to be updated into
    the first buffer.
In some examples, the operation method further com-
prises:
    sending, by the processor, an update command to the
    acceleration processing circuit; and
    acquiring, by the acceleration processing circuit, the map-
    ping information to be updated from the first buffer in
    response to the update command, and wherein
    the updating, by the acceleration processing circuit, the
    valid data table based on the mapping information to be
    updated comprises:
    updating, by the acceleration processing circuit, the valid
    data table automatically based on the mapping infor-
    mation to be updated.
In some examples, the processor comprises a memory
protection circuit, and the operation method further com-
prises:
    inhibiting, by the memory protection circuit, the processor
    from updating the valid data table.
In some examples, the operation method further com-
prises:
    acquiring, by the processor, the valid data table from the
    first buffer in response to a trim command from a host;
    and
    determining, by the processor, a block on which garbage
    collection needs to be performed in a memory device
    based on the valid data table.
In a third aspect, the present disclosure provides a
memory system, comprising:
    a memory device comprising a plurality of blocks; and
    the memory controller in any one of the above examples,
    wherein the memory controller is configured to control the memory device and update a valid data table,
    wherein the valid data table is to record a plurality of
    valid transmission unit counts, the valid transmission
    unit count indicates the number of transmission units
    that store valid data in a corresponding block.
    In examples of the present disclosure, the memory con-
troller comprises an acceleration processing circuit config-
ured to update the mapping table based on the mapping
information to be updated, and update the valid data table
based on the mapping information to be updated. In this way,
on the one hand, updating the valid data table by the
acceleration processing circuit can reduce resource occupa-
tion of the processor, thereby improving the working effi-
ciency and performance of the memory controller. On the
other hand, the processor does not need to execute software
to update the valid data table, thereby reducing the impact of
a software error on the stability of memory controller.
    In the examples of the present disclosure, the update of
the valid data table through the acceleration processing
circuit can reduce resource occupation of the processor,
thereby improving the working efficiency and performance
of the memory system. Furthermore, the processor does not
need to execute software to update the valid data table,
thereby reducing the impact of the software error on the
stability of the memory controller, and at the same time
simplifying the software design. In some examples, the
memory controller may further determine a block on which
garbage collection needs to be performed in the memory
device based on the valid data table.
    It will be understood that reference throughout this speci-
fication to "one example" or "an example" means that a
particular feature, structure, or characteristic associated with
the example is included in at least one example of the
present disclosure. Thus, the appearances of "in one
example" or "in an example" in various places throughout
this specification are not referring to the same example.
Furthermore, the particular features, structures or character-
istics may be combined in any suitable manner in one or
more examples. It should be understood that in various
examples of the present disclosure, the size of the sequence
numbers of the above-mentioned processes does not mean
the order of execution. The execution order of each process
should be determined by its functions and internal logic, and
should not constitute any limitation to the example process
of the present disclosure. The above sequence numbers of
the examples of the present disclosure are only for descrip-
tion and do not represent the advantages and disadvantages
of the examples.
    The above are only examples of the present disclosure,
and do not limit the patent scope of the present disclosure.
Equivalent structural transformations that are made based on
the contents of the description and drawings of the present
disclosure or direct/indirect applications in other related
technical fields under the inventive concept of the present
disclosure are included in the patent protection scope of the
present disclosure.

What is claimed is:
    1. A memory controller, comprising:
    a first buffer configured to buffer a valid data table and
        mapping information to be updated, wherein the valid
        data table is to record a plurality of valid transmission
        unit counts, the valid transmission unit count indicates
        a number of transmission units that store valid data in
        a corresponding block, the mapping information to be
        updated comprises at least one piece of mapping information from a logical address to a physical address, and each transmission unit corresponds to one physical address;

a second buffer configured to buffer a mapping table, wherein the mapping table is to record a plurality of pieces of mapping information; and an acceleration processing circuit coupled to the first buffer and the second buffer, respectively, and configured to:

update the mapping table based on the mapping information to be updated; and update the valid data table based on the mapping information to be updated, wherein the valid data table is updated to increase or reduce a valid transmission unit count of a block corresponding to the mapping information to be updated within an upper limit value and a lower limit value.

2. The memory controller of claim 1, wherein the acceleration processing circuit comprises a register configured to store an invalid physical address, and the acceleration processing circuit is configured to:

update the valid data table based on the mapping information to be updated and the invalid physical address.

3. The memory controller of claim 2, wherein the acceleration processing circuit is configured to:

in response to the physical address in the mapping information to be updated being the same as the invalid physical address, reduce the valid transmission unit count of the corresponding block; and in response to the physical address in the mapping information to be updated being different from the invalid physical address, increase the valid transmission unit count of the corresponding block.

4. The memory controller of claim 3, wherein the acceleration processing circuit is further configured to:

determine an upper limit value and a lower limit value of the valid transmission unit count;

in response to the valid transmission unit count being equal to the upper limit value, stop increasing the valid transmission unit count; and in response to the valid transmission unit count being equal to the lower limit value, stop reducing the valid transmission unit count.

5. The memory controller of claim 4, wherein the acceleration processing circuit is further configured to:

determine the upper limit value according to the number of the transmission units in the block.

6. The memory controller of claim 2, wherein the acceleration processing circuit comprises a table access assist circuit, and the register comprises a zero register.

7. The memory controller of claim 1, further comprising:

a processor coupled to the first buffer and configured to:

generate the mapping information to be updated based on a received logical address; and buffer the mapping information to be updated into the first buffer.

8. The memory controller of claim 7, wherein the processor is further configured to:

send an update command to the acceleration processing circuit, and wherein the acceleration processing circuit is configured to:

in response to the update command, acquire the mapping information to be updated from the first buffer; and update the valid data table automatically based on the mapping information to be updated.

18

9. The memory controller of claim 7, wherein the processor comprises a memory protection circuit configured to:

inhibit the processor from updating the valid data table.

10. The memory controller of claim 7, wherein the processor is further configured to:

in response to a trim command from a host, acquire the valid data table from the first buffer; and determine a block on which garbage collection needs to be performed in a memory device based on the valid data table.

11. An operation method of a memory controller, wherein the memory controller comprises:

a first buffer;

a second buffer; and an acceleration processing circuit coupled to the first buffer and the second buffer, respectively, wherein the operation method comprises:

buffering, by the first buffer, a valid data table and mapping information to be updated, wherein the valid data table is to record a plurality of valid transmission unit counts, the valid transmission unit count indicates a number of transmission units that store valid data in a corresponding block, the mapping information to be updated comprises at least one piece of mapping information from a logical address to a physical address, and each transmission unit corresponds to one physical address;

buffering, by the second buffer, a mapping table, wherein the mapping table is to record a plurality of pieces of mapping information; and updating, by the acceleration processing circuit, the mapping table based on the mapping information to be updated, and updating the valid data table based on the mapping information to be updated, wherein the valid data table is updated to increase or reduce a valid transmission unit count of a block corresponding to the mapping information to be updated within an upper limit value and a lower limit value.

12. The operation method of claim 11, wherein the acceleration processing circuit comprises a register configured to store an invalid physical address, and the updating, by the acceleration processing circuit, the valid data table based on the mapping information to be updated comprises:

updating, by the acceleration processing circuit, the valid data table based on the mapping information to be updated and the invalid physical address.

13. The operation method of claim 12, wherein the updating, by the acceleration processing circuit, the valid data table based on the mapping information to be updated and the invalid physical address comprises:

in response to the physical address in the mapping information to be updated being the same as the invalid physical address, reducing, by the acceleration processing circuit, the valid transmission unit count of the corresponding block; and in response to the physical address in the mapping information to be updated being different from the invalid physical address, increasing, by the acceleration processing circuit, the valid transmission unit count of the corresponding block.

14. The operation method of claim 13, wherein the operation method further comprises:

determining, by the acceleration processing circuit, an upper limit value and a lower limit value of the valid transmission unit count;

in response to the valid transmission unit count being equal to the upper limit value, stopping, by the acceleration processing circuit, increasing the valid transmission unit count; and in response to the valid transmission unit count being equal to the lower limit value, stopping, by the acceleration processing circuit, reducing the valid transmission unit count.

15. The operation method of claim 14, wherein the determining, by the acceleration processing circuit, an upper limit value of the valid transmission unit count comprises:

determining, by the acceleration processing circuit, the upper limit value according to the number of the transmission units in the block.

16. The operation method of claim 11, wherein the memory controller further comprises a processor coupled to the first buffer, and the operation method further comprises:

generating, by the processor, the mapping information to be updated based on a received logical address, and buffering the mapping information to be updated into the first buffer.

17. The operation method of claim 16, wherein the operation method further comprises:

sending, by the processor, an update command to the acceleration processing circuit; and acquiring, by the acceleration processing circuit, the mapping information to be updated from the first buffer in response to the update command, and wherein the updating, by the acceleration processing circuit, the valid data table based on the mapping information to be updated comprises:

updating, by the acceleration processing circuit, the valid data table automatically based on the mapping information to be updated.

18. The operation method of claim 16, wherein the processor comprises a memory protection circuit, and the operation method further comprises:

inhibiting, by the memory protection circuit, the processor from updating the valid data table.

19. The operation method of claim 16, wherein the operation method further comprises:

acquiring, by the processor, the valid data table from the first buffer in response to a trim command from a host; and determining, by the processor, a block on which garbage collection needs to be performed in a memory device based on the valid data table.

20. A memory system, comprising:

a memory device comprising a plurality of blocks; and a memory controller configured to control the memory device and update a valid data table, wherein the memory controller comprises:

a first buffer configured to buffer the valid data table and mapping information to be updated, wherein the valid data table is to record a plurality of valid transmission unit counts, the valid transmission unit count indicates a number of transmission units that store valid data in a corresponding block, the mapping information to be updated comprises at least one piece of mapping information from a logical address to a physical address, and each transmission unit corresponds to one physical address;

a second buffer configured to buffer a mapping table, wherein the mapping table is to record a plurality of pieces of mapping information; and an acceleration processing circuit coupled to the first buffer and the second buffer, respectively, and configured to:

update the mapping table based on the mapping information to be updated; and update the valid data table based on the mapping information to be updated, wherein the valid data table is updated to increase or reduce a valid transmission unit count of a block corresponding to the mapping information to be updated within an upper limit value and a lower limit value.

\* \* \* \* \*